May 11, 1926.

W. A. BLACK

VALVE

Filed Dec. 11, 1924

INVENTOR
Walter A. Black.
BY M. C. Gillham.
ATTORNEY

Patented May 11, 1926.

1,584,600

UNITED STATES PATENT OFFICE.

WALTER A. BLACK, OF KANSAS CITY, MISSOURI, ASSIGNOR OF ONE-HALF TO JAMES T. JENNINGS, OF KANSAS CITY, MISSOURI.

VALVE.

Application filed December 11, 1924. Serial No. 755,164.

My invention relates to valves, and particularly to a device of this character commonly known as a ball valve.

An object of the invention is to provide a simple, inexpensive, and efficient self cleaning non-pack ball valve which may be used in connection with pipe lines and conduits to cut on and off the flow of liquids, fluids, gases and vapors.

A further object of the invention is to provide the ball valve with facilities for receiving and discharging liquids, fluids, gases, and vapors from an intake.

A further object of the invention is to provide the ball valve with facilities for receiving liquids, fluids, gases, and vapors, from a single intake supply pipe and discharging the same to a plurality of outlet pipes, or, to receive the same from a plurality of intake pipes and discharge to a single outlet pipe.

I attain these objects and other advantages by means of the structure and combination of parts illustrated in the accompanying drawing in which—

Similar numerals of reference refer to corresponding parts throughout the several views.

Figure 1:
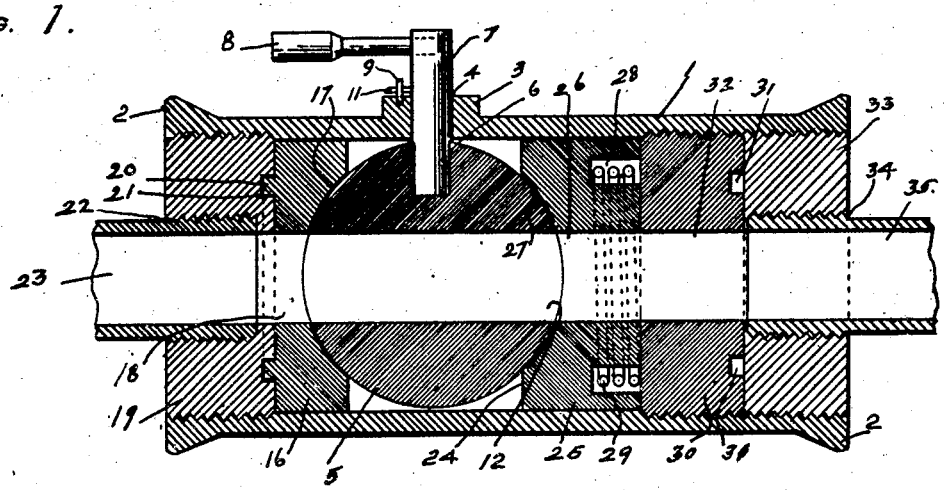
Figure 1, is a vertical section of a ball valve embodying my invention.
Figure 2:
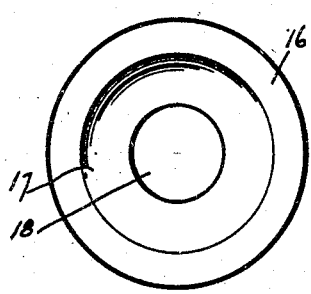
Figure 2, is a plan view of the valve seat member, and showing the port therethrough and the seat for the valve.
Figure 4:
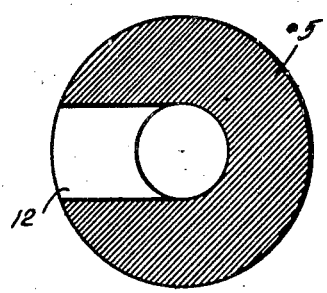
Figure 4, is a cross section through the ball valve, and showing the discharge outlet of the passage through the valve at right angles to the intake thereof.
Figure 6:
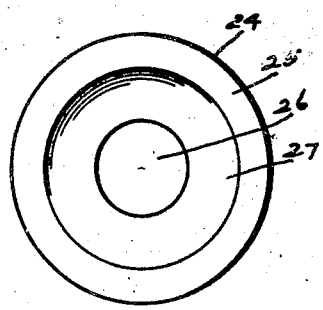
Figure 6, is a plan view of the inner side of the thrust bearing member, and showing the ball valve seat thereon and the port therethrough for communicating with the passage through the valve.
Figure 3:
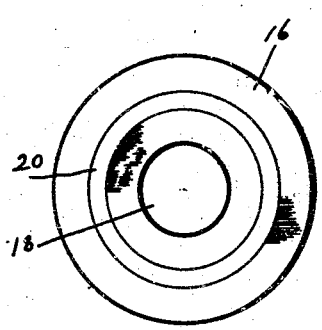
Figure 3, is a plan view of the reverse side of the seat member, and showing the concentric flange thereon.
Figure 5:
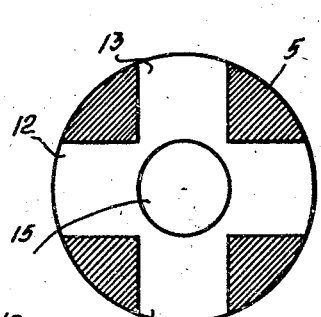
Figure 5, is a similar cross section through the ball valve, and showing a plurality of passages through the valve for communicating with the intake pipe or pipes and with the outlet pipe or pipes.
Figure 7:
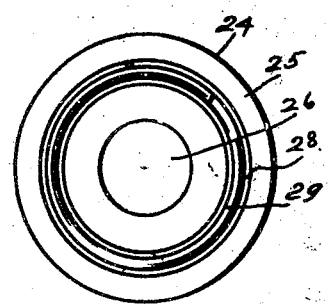
Figure 7, is a plan view of the outer side of the thrust bearing member, and showing the port therethrough and the concentric channel therein for receiving the compression spring.
Figure 8:
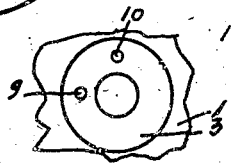
Figure 8, is a top plan view of the boss on a fragment of the casing, and showing the stops for limiting the rotation of the ball valve.

Referring to the drawings the numeral 1, designates a tubular casing made of any suitable metallic substance, such as iron, steel, brass, bronze, and the like. The end portions of the casing are reinforced, as shown at 2, and intermediate of the length of the casing is an integral boss 3, having a bore 4, which communicates with the interior of the casing. The inner surface of the wall of the casing is machined with true precision to provide a circular bore of equal diameters throughout. A ball or globular valve 5, is, also, machined with precision to be passed into the casing without frictionally impinging upon the inner surface of the wall of the casing when it is stationed therein in operative position. The ball valve 5, is provided at its vertical axis with a bore 6, in which bore a stem 7, is secured in any suitable manner known to the art, the stem being extended through the bore 4, in the boss 3. On the upper end of the stem is a handle 8, for conveniently manipulating the ball valve to effect rotation thereof. Stops 9 and 10, are removably mounted on the boss 3, upon spaced radial lines to, thereby, limit the rotation of the ball valve to substantially ninety degrees of arc. A finger 11, is projected laterally from the stem to between the stops 9 and 10. A hole 12, is bored entirely through the ball valve, which hole is centered at the horizontal axis of the valve, as shown in Figures 1 and 5. The hole 12, may be extended to the center of the ball valve and then turned at right angles thereto to an outlet at the lower end of the vertical axis of the valve, as shown in Figure 4. The hole 12, may, also, be arranged to communicate with similar holes 13 and 14, at the horizontal axis of the valve and, at the same time, communicate with a hole 15, at the vertical axis thereof. A disk 16, having its periphery machined to slidably impinge upon the inner surface of the wall of the casing with precision, is provided on its inner side with a concentric concaved valve seat 17, which is machined to receive thereon with precision the periphery of the ball valve, the disk being, also, provided with a port 18, which registers with the hole or passage 12, in the valve. The disk 16, is advanced into the casing until the seat thereon is brought to bear on the periphery of the ball valve. The end portions of the casing are provided with internal screw threads. A disk head member 19, having its periphery provided with external screw threads, is screwed into the end of the casing and brought to bear on the disk 16, to hold the latter in place. On the outer side of the disk 16, is a concentric flange 20, adapted for fitting in a channel 21 concentrically formed in the inner side of the head to make the parts mentioned interfitting. A hole 22, is apertured centrally through the head 19, which hole registers with the hole 18, in disk 16. The wall of the hole 22, is provided with internal screw threads adapted for receiving the screw end of an intake pipe 23. A concentric thrust bearing member 24, comprising a disk 25, having centrally therethrough a port 26, which registers with the hole 12, in the ball valve and a concentric concaved bearing seat 27, machined to seat the ball valve thereon with precision and a concentric channel 28, in its outer side. The periphery of the thrust bearing member is machined to slidably impinge upon the inner surface of the casing with precision. In the channel 28, is lodged a compression spring 29. The thrust bearing member is advanced into the casing in opposed relation to the seat 17, until the bearing seat 27, shall receive the periphery of the ball valve. A disk member 30, provided on its periphery with external screw threads, is screwed into the casing and brought to impinge upon the spring 29, thus tensioning the same as the disk comes to impinge upon the outer side of the thrust bearing member. In the outer side of the disk 30, are spaced apart slots 31, which are adapted for receiving a slot key wrench to screw the disk in place. A hole 32 is apertured centrally through the disk 30, which hole registers with the hole 26, in the thrust bearing member. A disk head 33, having external screw threads on its periphery is screwed into the casing to and against the disk 30. A hole 34, is apertured centrally through the head 33, which hole registers with the hole in the disk 30, the wall of the hole being provided with internal screw threads adapted for receiving the screw end of an outlet pipe 35.

The registry of the holes 12, 18, 22, 26, 32, and pipes 23 and 35, provides a continuous passage, thus reducing to a minimum the friction incident to the flow therethrough. The exact and precise machining of the contacting surfaces of the associated parts of the valve prevents leakage at any point, thus obviating the necessity for using gaskets and packing devices common to valves of the conventional type. The perfect ball valve and the correspondingly perfect bearing seats therefor prevents leakage at the contact of the valve and its seats.

In the instant case, the valve is rotated to bring the hole or passage 12, therethrough in horizontal alignment with the intake and outlet pipes. To shut off the flow, the ball valve is rotated back until the finger 11, engages the stop 10, when the valve will have been rotated through ninety degrees of arc, thus bringing and presenting the solid area of the periphery of the ball valve to the intake passage and outlet passage as well, thereby shutting off the flow of the contents of the intake pipe. As many holes or passages through the ball valve may be had as the circumference of the ball will permit, alternating the areas of the holes with solid areas of the surface of the periphery of the ball valve. In Figure 4, is shown a passage through the valve in horizontal direction to the center thereof and then continuing downwardly at right angles to an outlet, not shown. In Figure 5, the valve is shown invested with a plurality of passages, all of which passages may be in communication with a single intake pipe, not shown, or a plurality of outlet pipes, not shown, or, communicating with a plurality of intake pipes and a single outlet pipe. The tension spring 29, in the environment shown, reacts to exert a sensitive pressure on the thrust bearing 25 and hold it in close relation to the valve. In Figure 1 the spring 29 is shown at its maximum compression. As valve wear develops the spring moves the thrust bearing member inward to take up the wear. If the wear is considerable the spring compression will be lessened and the joint formed by the contacting faces of the members 25 and 30 will open a distance corresponding to the valve wear. In such case the member 30 is again screwed against the thrust bearing member, thus again forming a liquid tight joint and again compressing the spring 29 to its definite degree of compression. The member 33 is then screwed against the member 30. If it is desired to remove sedimentary substance or other matter from the valve bearings, the stops 9 and 10, are removed and the valve rotated at high speed. Adjustment of the bearing members to the valve may, also, be accomplished by advancing the attendant disk supports 19, 30 and 33. The valve may be rotated to entirely shut off communication with the intake, or, rotated partially to regulate the volume of the flow therefrom through the valve. The valve is useful in connection with trunk pipe lines and feeder pipe lines communicating therewith. It may also be connected to water, gas, and steam pipes and containers to there function as a faucet or stop-cock.

Having described my invention what I claim is—

1. In a valve, a cylindrical casing, a transverse valve seat member having axially a passage slidably mounted in said casing and provided on its outer side with an annular guiding flange and on its inner side with a ball valve seat, a transverse head member having axially a passage registering with the passage in said seat member and an annular recess on its inner side receiving the guiding flange on said seat member adjustably mounted in said casing in close relation to the valve seat member, a ball valve member rotatably mounted in said casing and having a passage registering with the passage in said valve seat member, said valve being seated on the valve seat member, a transverse thrust bearing member slidably mounted in said casing in opposed relation to said valve seat member and bearing on said valve and having axially a passage registering with the passage in said valve member and on its outer side an annular recess, a coil spring lodged in the recess in said thrust bearing member, a transverse tensioning member adjustably mounted in said casing in close relation to said thrust bearing member and having axially a passage registering with the passage in the thrust bearing member, and a transverse head member adjustably mounted in the casing in close relation to said tensioning member and having axially a passage registering with the passage in the tensioning member.

2. In a valve, a cylindrical casing, a transverse valve seat member having axially a passage slidably mounted in said casing and provided on its outer side with an annular guiding flange and on its inner side with a ball valve seat, a transverse head member having axially a passage registering with the passage in said seat member and an annular recess on its inner side receiving the guiding flange on said seat member adjustably mounted in said casing in close relation to the valve seat member, a ball valve member rotatably mounted in said casing and seated on said seat member and having a plurality of passages adapted to alternately register with the passages in said seat member, a transverse thrust bearing member having axially a passage adapted to register with the passages in said valve member slidably mounted in said casing in close relation to the valve member and provided on its outer side with an annular recess, a coil spring lodged in the recess in said thrust bearing member, a transverse tensioning member adjustably mounted in said casing in close relation to said thrust bearing member and having axially a passage registering with the passage therein, and a transverse head member adjustably mounted in said casing in close relation to said tensioning member and having axially a passage registering with the passage therein.

WALTER A. BLACK.